F. L. DARLING.
WHEEL RIM.
APPLICATION FILED MAR. 3, 1917. RENEWED SEPT. 19, 1918.
1,288,528.
Patented Dec. 24, 1918.
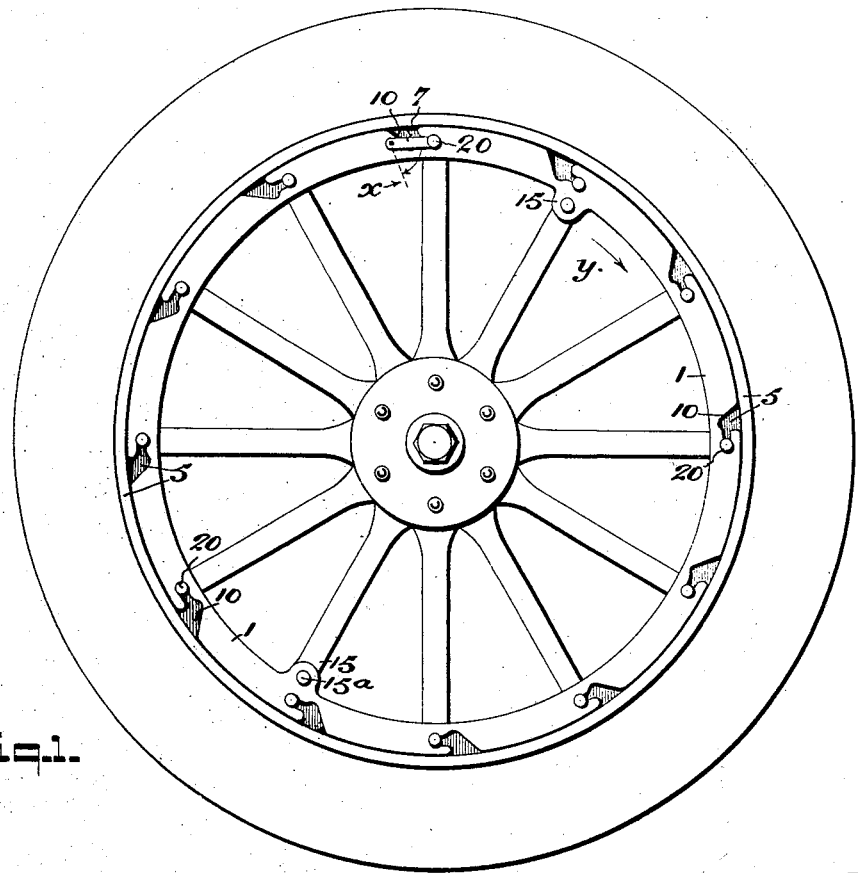
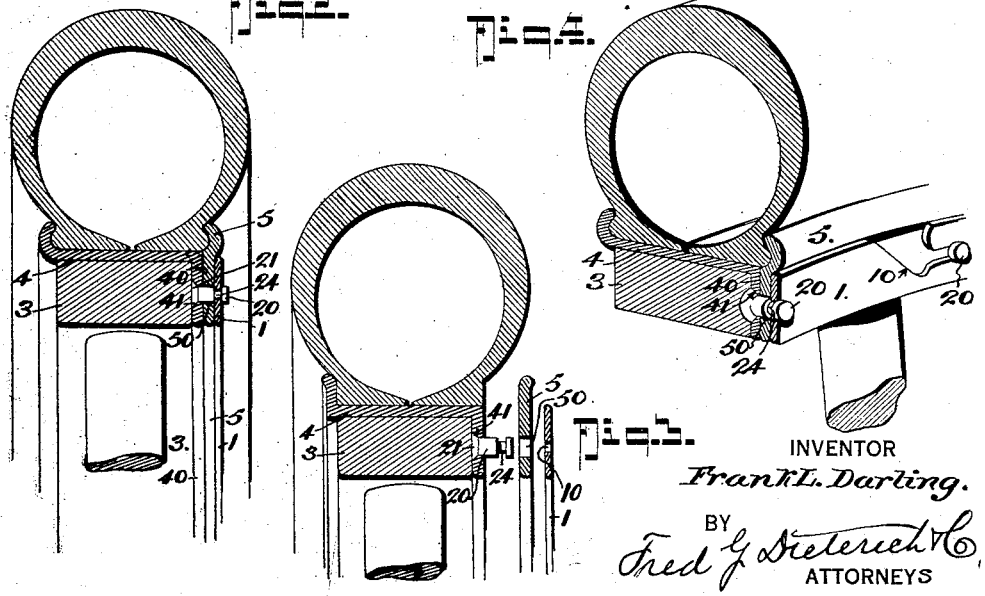
INVENTOR
Frank L. Darling.
BY
Fred G. Dieterich
ATTORNEYS

UNITED STATES PATENT OFFICE.

FRANK LEE DARLING, OF LONG BEACH, CALIFORNIA.

WHEEL-RIM.

1,288,528.

Specification of Letters Patent.

Patented Dec. 24, 1918.

Application filed March 3, 1917, Serial No. 152,211. Renewed September 19, 1918. Serial No. 254,863.

*To all whom it may concern:*

Be it known that I, FRANK LEE DARLING, residing at Long Beach, in the county of Los Angeles and State of California, have invented a new and Improved Wheel-Rim, of which the following is a specification.

My invention relates to certain new and useful improvements in wheel rims designed for the quick attachment and removal of pneumatic tires from wheels and the invention especially has for its object to provide a convenient and effective construction of rim that may be manufactured at a minimum expense and is of such design and construction that the tire can be quickly removed or replaced on the rim with minimum effort and without the necessity of removing bolts or nuts.

In my present construction, the felly band section of the rim is provided with the ring-like portion at one side which engages the side of the felly, this portion being provided with rivet studs that project through apertures in the ring-like portions and are held from displacement by engaging the felly, the studs projecting through apertures in the opposing rim member and having headed shanks adapted to engage in key-hole slots in a locking ring, the key-hole slots of which are open to the periphery to prevent clogging by dirt and foreign substances.

The invention also resides in those novel details of construction, combination and arrangement of parts all of which will be first fully described, then be specifically pointed out in the appended claims, and illustrated in the accompanying drawing, in which:

Figure 1 is a side elevation of a wheel with the invention applied.

Fig. 2 is a detail cross section of the same.

Fig. 3 is a view similar to Fig. 2 showing the rim members separated and the locking ring also separated.

Fig. 4 is a detail perspective view and part section showing the parts in the assembled position.

In the drawing, 1 designates the felly of the wheel on which the rim is held in any well-known manner. The rim which constitutes my present invention comprises a main member 4 adapted to be fitted onto the felly 3 and at one side the member 4 has a tire engaging flange, and at the other side it has a depending ring-like member 40 which engages the side of the felly and is designed to lie in close contact with the same. 5 indicates the other rim member which is equipped to engage the tire and also has an annular ring-like portion to lie against the ring-like member 40 of the rim member 4. 20 designates studs which are passed through the apertures 41 in the ring-like member 40 from the felly side and are rivet headed as at 21 to be countersunk into the apertures 41 and lie snugly against the felly 3 when the ring-like member 40 is lying against the same. The studs 20 have shanks 24 near the ends to leave heads, the diameter of the heads and the diameter of the shanks of the studs being approximately the same so that the rim member 5 can be easily fitted over onto the studs in snug engagement with the same.

1 designates a locking ring which is provided with key-hole slots 10 to engage in the necks 24 of the studs, the key-hole slots 10 being opened outwardly toward the periphery of the ring, so as to be readily freed from dirt and foreign matter in removing the ring 1 for the purpose of demounting the tire.

7 is a latch that is pivoted to the locking ring, and is designed to be brought up to engage an adjacent stud 20 to prevent rotary motion of the locking ring 1 when the tire is deflated, it being understood that when air pressure is in the tire, ring 1 has retaining frictional engagement with the rim member 5, so that danger of rotation of the ring 1 to tend to unlock it or release it is avoided, the latch 7 being in the nature of a spring snap.

It will be noticed that by inserting the studs 20 from the felly side through the ring member 40, they are held in place without the necessity of fastening them to the member 40 so that should the studs become damaged in any way, they can be easily removed and new ones substituted by removing the rim member 4 from the felly.

I have shown no means for fastening the rim member 4 on the felly as any desired means for that purpose may be employed and I do not in this application lay any claim to any particular means for securing the rim to the felly of the wheel, as the means for securing the same to the felly of the wheel will depend upon whether or not it is desired to have the rim member a permanent part of the wheel or to have it demountable, as a unit.

15 designates laterally projected ears on the ring 1 for conveniently turning the same in the locking and unlocking directions and to facilitate this operation, the ears may have wrench receiving members 15ª, if desired.

In order to remove a tire, the latch 7 is moved to the position indicated by the dotted line x in Fig. 1, and the locking ring in turn, in the direction of the arrow y. Any dirt that might have accumulated in the open hole slots will be automatically ejected and thus not interfere with the ready release of the locking ring.

After the locking ring has been removed, the rim member 5 may be also removed and the tire taken from the rim.

To replace the tire the foregoing operations are reversed.

From the foregoing description, taken in connection with the accompanying drawing, it is thought the complete construction, operation and advantages of my invention will be readily understood by those skilled in the art.

What I claim is:

1. As a new article, a rim comprising a main member having an annular portion to fit on the periphery of the wheel, one side of said annular portion terminating in a tire engaging flange, the other side being provided with an inwardly extended ring member adapted to lie against the side of a wheel felly, studs carried by said ring-like member, a second rim member of ring-like form having a tire engaging flange and apertured to fit on said studs and lie in contact with said ring-like member of said first rim member, and a locking ring coöperating with said studs to hold said rim members together, said locking ring having open key-hole slots opening toward the periphery of the locking ring and means whereby said locking ring may be turned to lock and unlock the same.

2. A rim comprising a main member having a tire engaging flange at one edge and adapted to fit on the periphery of a wheel, said main member having a ring-like portion at the other edge adapted to project inwardly and lie against the side of a wheel felly, studs carried by said ring-like member and having rivet-heads counter-sunk into the same from the felly side of the ring whereby the said studs will be held in place when said ring-like member is lying against the felly, said studs having constrictions to provide heads, the diameter of the heads and the diameter of the stud body being substantially the same, a second rim member having apertures to snugly fit on said studs and adapted to lie against said ring-like portion of said first rim member and having an engaging flange portion, and a locking ring having open key-hole slots to coöperate with said studs, the openings of said slots extending to the periphery of the locking ring whereby said slots are self-clearing, and means for turning said locking ring to engage or release the same and a latch device for holding said locking ring against unlocking displacement.

FRANK LEE DARLING.